United States Patent [19]
Roeben et al.

[11] 3,821,894
[45] July 2, 1974

[54] SENSOR FOR SUBMERSIBLE PROBES

[75] Inventors: Dieter Roeben, Abbehausen; Horst Urban, Nordenham, both of Germany

[73] Assignee: Norddeutsche Seekabelwerke Aktiengesellschaft, Nordenham, Germany

[22] Filed: July 20, 1972

[21] Appl. No.: 273,514

[30] Foreign Application Priority Data
Aug. 5, 1971   Germany............................ 2139206

[52] U.S. Cl............................................... 73/170 A
[51] Int. Cl................................................ G01r 3/00
[58] Field of Search........................... 73/170; 340/5

[56] References Cited
OTHER PUBLICATIONS
"Ocean Sciences" (E. John Long Ed. 1964).

Primary Examiner—Richard C. Queisser
Assistant Examiner—Stephen A. Kreitman
Attorney, Agent, or Firm—Michael S. Striker

[57] ABSTRACT

A sensor body has an outer peripheral exposed surface, and is provided thereon with a plurality of discrete spots of an anti-fouling substance, with each of the spots being separate and spaced from the respective adjacent spots.

10 Claims, 1 Drawing Figure

SENSOR FOR SUBMERSIBLE PROBES

BACKGROUND OF THE INVENTION

The present invention relates generally to sensors, and more particularly to sensors for submersible probes. Still more particularly the invention relates to a sensor for submersible probes which is provided with a mechanically relatively rigid and/or electrically conductive anti-fouling substance.

It is well known that fouling of ship's hulls and the like occurs over a period of time, due to the encrustation with algae, marine life and the like. Because of various disadvantageous effects this has, including upon the speed of the vessel, it is known to cover the hulls with so-called anti-fouling paint, that is paint which incorporates poison or copper powder and which at least for a certain time prevents the growth of such organisms on the hull.

The problem exists, however, not only on ship's hulls but also on submersible probes, that is underwater probes. Heretofore the use of such probes has been predominantly restricted to exploration vessels where the probes were lowered into the sea for relatively short periods of time. In such applications the vessel is usually stationary and the probe is lowered to a desired depth, or else, if the vessel moves, the probe is trailed behind it. Because of the brief periods of time for which such probes were submerged, fouling problems did not occur since growths of algae or marine life on the probes could not develop over such short periods of time, aside from the fact that the movement of the probe during the time it remained in the water tended to prevent such growth.

However, this is not true in the case of probes which are stationary and which remain submerged for prolonged periods of time, as is becoming more customary in underwater exploration. In such cases the growth of fouling organisms on the probes assumes importance, especially because in most instances the development of such growth tends to disadvantageously influence the proper functioning of the probe itself, or rather of the sensors which are associated with the probe.

It is of course known from the art to utilize alloys of copper which either entirely prevent or at least significantly retard the growth of such fouling organisms. However, these copper alloys are mechanically relatively rigid and electrically conductive. While it is possible to coat such sensors with such alloys, thereby preventing or at least substantially preventing the growth of fouling organisms on the sensors, many applications exist in which the use of such a coating disadvantageously influences the physical and/or electrical operation of the probe, and may lead to the registration of wrong results. Evidently, this would be an unacceptable exchange of one difficulty for another.

SUMMARY OF THE INVENTION

It is, accordingly, an object of the present invention to provide an improved sensor for submersible probes, which is not possessed of the advantages outlined above.

More particularly it is an object of the invention to provide such an improved sensor which is protected against fouling by the growth of algae or other marine organisms over a prolonged period of time, but wherein the anti-fouling protection employed does not disadvantageously influence the proper functioning of the sensor itself.

In pursuance of these objects, and of others which will become apparent hereafter, one feature of the invention resides in a sensor for submersible probes which, briefly stated, comprises a combination of a sensor body and a plurality of discrete spots of an anti-fouling substance provided on the sensor body, with each of the spots being separate and spaced from respective adjacent spots.

The term "spots" as employed herein is not intended to be restricted to dots or the like, but is intended to designate a configuration in which each quantity of anti-fouling substance in effect constitutes an island which is entirely separate and spaced from any adjacent spots. In other words, no configurational or dimensional relationship is intended to be expressed by the term "spots".

The anti-fouling substance employed may be relatively stiff in its mechanical characteristic but, if employed in the manner according to the present invention, this does not influence the mechanical deformability of the sensor body, which is frequently important, especially if the sensor body must have such deformability in order to be able to properly measure certain physical parameters. Moreover, even if the sensor is intended for measuring of electrical values, where a partially or completely closed coating or sheath of metallic material or of conductive material would disadvantageously influence the sensed results, the present invention avoids these problems. It will be appreciated that the subdivision of the spots and their dimensions and configurations can be readily accommodated to the mechanical and/or electrical requirements made of the sensor.

In many instances it will be sufficient to suppress the conductivity of the surface of the sensor body only in a certain direction, or to permit its mechanical deformability in a specific direction. In such instances the spots may be in strip-shaped configuration, oriented in accordance with the desired direction.

If a strip-shaped configuration is chosen, then it may be advantageous if strips of the anti-fouling substance alternate with strips of an elastic and/or electrically insulating material, a construction which is particularly resistant to attack or damage. The direction in which the strips are oriented will depend upon the electrical and/or mechanical requirements made of the particular sensor, and the strips of elastic and/or electrically insulating material may be very narrow so that an advantageous relationship of protected (against fouling) to unprotected surface area is obtained.

By resort to the present invention up to and in excess of 90% of the exposed surface of the sensor body can be covered with anti-fouling substance without causing the problems which have been outlined above with respect to what is known. If copper alloys are used, especially those having between 80-85 percent of copper and between 20 and 15 percent of manganese, where small quantities of iron (between 0.5-1.5 percent) or nickel (between 0.3-1.0 percent) may be present as traces, a fouling due to the growth of algae or other marine organisms is largely prevented.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

Examples of the complete composition of a copper alloy are: copper 85 percent, manganese 14 percent, iron 1 percent; copper 80 percent, manganese 19 percent, nickel 1 percent; copper 82 percent, manganese 17.5 percent, iron 0.5 percent.

DESCRIPTION OF THE PREFERRED EMBODIMENTS

Figure 1:
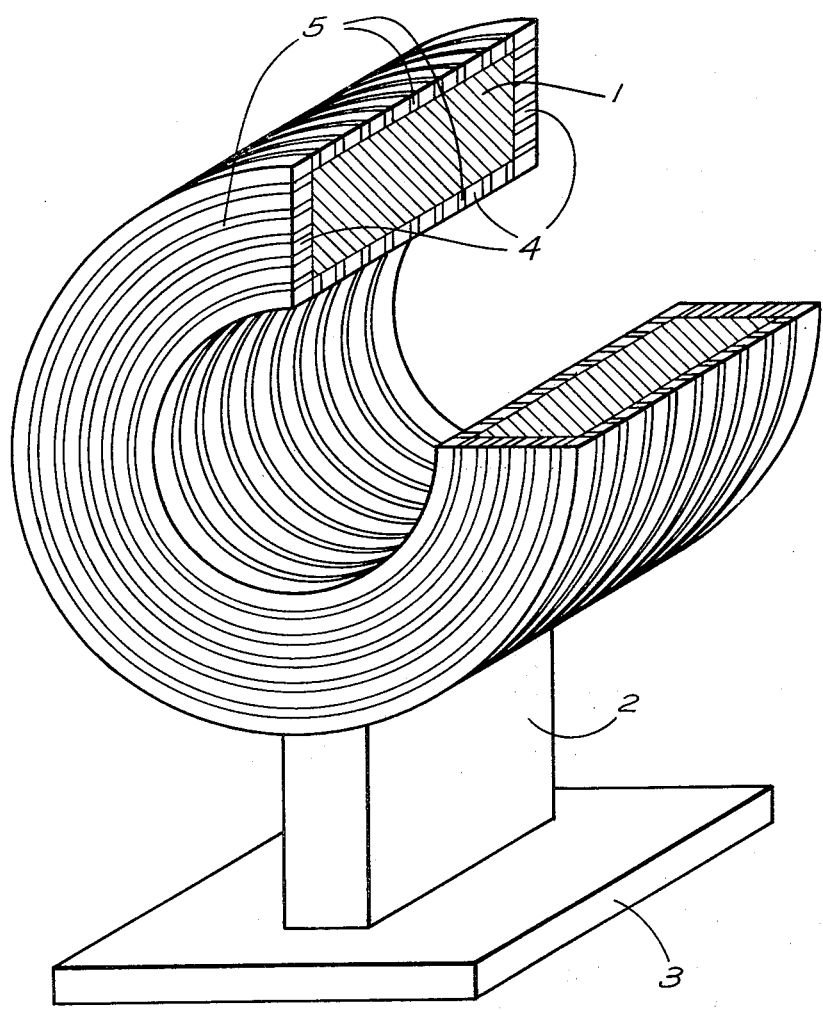
FIG. 1 is a diagrammatic partly sectioned perspective illustrating one embodiment of the invention.

Discussing FIG. 1, it will be seen that here there is illustrated a sensor intended for measuring the electrical conductivity of water without the use of electrodes. In such a sensor the magnetic forces of two adjacent annular core coils must be associated with the current induced in the water, so that in the sensor an electrical conductivity of the surface of the sensor body in axial direction of the inner and outer coil sides, and in radial direction of the end faces of the core body, must be prevented.

The sensor in this embodiment has a double coil body 1 which is surrounded by rings 4 of a suitable copper alloy and intermediate layers 5 of electrically non-conductive material. The sensor is mounted on a base 2 and a plate 3.

Each of the rings or annuli 4 of copper alloy constitutes one of the spots mentioned herein, that is the copper alloy is the anti-fouling substance. In the illustrated embodiment the annuli 4 are 2 mm wide and the intermediate layers or annuli 5 are approximately 0.2 mm wide. In this construction influencing of the electrical functioning of the sensor is adequately prevented despite the presence of the anti-fouling annuli 4, whereas on the other hand the surface of the sensor is covered in excess of 90 percent with the anti-fouling copper alloy of which the annuli 4 are composed.

It will be understood that the element described above may also find a useful application in other types of constructions differing from the type described above.

While the invention has been illustrated and described as embodied in a sensor for submersible probes, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. In a sensor for submersible probes, a combination comprising a sensor body with an outer peripheral surface, said body being electrically conductive and the sensing capability of which is a function of the electrical conductivity; a plurality of discrete spots of an anti-fouling substance of a copper alloy provided on said sensor body; and electrically insulating material separating the respective adjacent spots on said sensor body by such a distance that said electrical conductivity of said sensor body is not adversely affected, said spots having a combined surface area equal to at least 90 percent of the area of an outer peripheral surface of said body on which they are provided.

2. A combination as defined in claim 1, wherein said anti-fouling substance is non-flexible.

3. A combination as defined in claim 1, wherein said anti-fouling substance is electrically conductive.

4. A combination as defined in claim 1, wherein said spots are strip-shaped.

5. A combination as defined in claim 1, wherein said anti-fouling substance is a copper alloy.

6. A combination as defined in claim 5, wherein said copper alloy is composed predominantly of 80–85 percent copper and 20–15 percent manganese.

7. A combination as defined in claim 6, wherein said copper alloy further comprises trace quantities of iron or nickel.

8. A combination as defined in claim 1, wherein said copper alloy is composed predominantly of 80–85 percent copper and 20–15 percent manganese.

9. A combination as defined in claim 8, wherein said copper alloy further comprises trace quantities of iron or nickel.

10. A combination as defined in claim 1, wherein said spots are lamella-shaped strips substantially normal to said outer peripheral surface.

* * * * *